(12) United States Patent
Leonhardt et al.

(10) Patent No.: US 7,676,817 B1
(45) Date of Patent: Mar. 9, 2010

(54) MEDIA DRIVE SYSTEM HAVING A PLURALITY OF QUEUING POSITIONS

(75) Inventors: Michael L. Leonhardt, Longmont, CO (US); Michael V. Konshak, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 1171 days.

(21) Appl. No.: 11/254,963

(22) Filed: Oct. 20, 2005

(51) Int. Cl.
*G11B 17/03* (2006.01)
*G11B 17/10* (2006.01)

(52) U.S. Cl. .................. 720/615; 369/30.85; 369/30.87

(58) Field of Classification Search ................ 369/30.4, 369/30.45–30.43, 30.48–30.49, 30.55, 30.57, 369/30.6–30.61, 30.65–30.66, 30.7, 30.72, 369/30.75–30.76, 30.83, 30.85, 30.87, 30.9, 369/30.92; 360/92.1, 98.04–98.08; *G11B 17/04, G11B 17/08, 17/10, 17/12, 17/14, 17/16, G11B 17/18, 17/20, 17/22*
See application file for complete search history.

(56) References Cited

U.S. PATENT DOCUMENTS

| 5,058,090 | A | * | 10/1991 | Ueno et al. ............... 369/30.89 |
| 5,128,912 | A | | 7/1992 | Hug et al. |
| 5,253,246 | A | | 10/1993 | Leonhardt et al. |
| 5,513,156 | A | | 4/1996 | Hanaoka et al. |
| 5,646,918 | A | | 7/1997 | Dimitri et al. |
| 5,671,198 | A | * | 9/1997 | Tsuchiya et al. ......... 369/30.32 |
| 5,818,723 | A | | 10/1998 | Dimitri |
| 5,956,301 | A | | 9/1999 | Dimitri et al. |
| 6,034,927 | A | * | 3/2000 | Pollard .................... 369/30.45 |
| 6,038,490 | A | | 3/2000 | Dimitri et al. |
| 6,094,321 | A | * | 7/2000 | Pollard ...................... 360/92.1 |
| 6,493,604 | B1 | | 12/2002 | Kappel et al. |
| 6,532,402 | B2 | | 3/2003 | Ostwald et al. |
| 6,609,046 | B2 | | 8/2003 | Ostwald et al. |
| 2002/0122271 | A1 | * | 9/2002 | Coffin et al. .................. 360/92 |
| 2004/0165309 | A1 | * | 8/2004 | Deckers ................... 360/98.04 |

FOREIGN PATENT DOCUMENTS

JP          08329583 A   * 12/1996

OTHER PUBLICATIONS

Machine translation of JP 08329583 A, with abstract.*

* cited by examiner

*Primary Examiner*—Andrea L Wellington
*Assistant Examiner*—Nathan Danielsen
(74) *Attorney, Agent, or Firm*—Brooks Kushman P.C.

(57) ABSTRACT

A media drive system includes a housing and a drive unit at least partially disposed within the housing. A media handler arrangement defines a plurality of queuing positions for media objects, and a receiving area within the housing receives storage units defining at least one other queuing position. The drive system reduces latency through the use of the queuing positions to speed transfer and access to media objects.

13 Claims, 2 Drawing Sheets

MEDIA DRIVE SYSTEM HAVING A PLURALITY OF QUEUING POSITIONS

BACKGROUND OF THE INVENTION

1. Field of the Invention

The present invention relates to a media drive system which has a plurality of queuing positions.

2. Background Art

In today's information-driven world, electronic media provides a mechanism for efficiently storing, and providing access to, large amounts of information. For example, large quantities of information can be stored on magnetic tapes, typically housed in a protective cartridge. Many such cartridges can be stored in magazines which can be remotely accessed by an automated robotic device, such as a "picker", which can deliver the cartridges to a device, such as a computer tape drive. Many such magazines may be arranged to form a media library, which consists of hundreds, or perhaps thousands of tape cartridges, or other media objects.

As the size of media libraries increases, so too does the need to have efficient mechanisms for transporting the media between a media reader and the storage magazines. One such attempt to deal with this issue is described in U.S. Pat. No. 5,646,918 issued to Dimitri et al. on Jul. 8, 1997. Dimitri et al. describes the operation of a multi-gripper accessor in an automated storage system. While information from a first cartridge is being accessed in a drive unit, one of the grippers retrieves a second cartridge from a storage cell. When the drive unit is done accessing information from the first cartridge, the other gripper retrieves the first cartridge from the drive, while the first gripper delivers the second cartridge into the drive.

Increasingly, non-tape media are being used to store information. For example, optical disks provide high density storage, thereby providing a space savings over lower density media. In order to employ the use of existing storage libraries, including automated robotic devices, such as pickers, non-tape media may be housed within a cartridge having a tape form factor. In this way, an existing library may be converted to non-tape media with relative ease. In the case of media having a disk-like form factor—e.g., an optical disk—a single cartridge can contain multiple disks. This presents the problem of accessing the individual disks (or other removable media objects) from the storage cartridge once it has been placed in the drive unit by the picker. Moving the disks to and from the drive unit using a conventional loader adds an undesirable latency to the media loading/access process. When a disk is no longer needed, it must be removed from the drive unit and transferred back to the cartridge, where a new disk is accessed and transported to the drive unit. Therefore, it would be desirable to have a media drive system configured to reduce this type of loader function latency.

SUMMARY OF THE INVENTION

The present invention provides a media drive system which reduces loader function latency for media.

The present invention also provides a plurality of queuing positions within a drive system to minimize loading and access time of media.

The invention further provides a media drive system operable on media objects which are capable of being stored in a storage unit. The media drive system includes a housing which defines a receiving area configured to receive a plurality of the storage units. At least one of the storage units in the receiving area defines a queuing position. A drive unit is at least partially disposed within the housing, and a media handler arrangement is configured to transfer media objects between the storage units in the receiving area and the drive unit. The media handler arrangement includes a first media handler which defines a first queuing position for a media object proximate the drive unit. The media handler arrangement also includes a second media handler which defines a second queuing position for a media object proximate the drive unit. The first media handler is operable to facilitate transfer of a media object between the drive unit and the first queuing position, and between the first queuing position and the storage units in the receiving area. The second media handler is operable to facilitate transfer of a media object between the drive unit and the second queuing position, and between the second queuing position and the storage units in the receiving area.

The invention also provides a media drive system which is operable on media objects which are capable of being stored in a storage unit. The media drive system includes a housing defining a receiving area which is configured to receive at least one of the storage units. The drive system also includes a drive unit at least partially disposed within the housing, and a media handler arrangement which is configured to transfer media objects between the at least one storage unit in the receiving area and the drive unit. The media handler arrangement includes a first media handler which is configured to deliver and remove media objects to and from the at least one storage unit in the receiving area. The first media handler is also configured to temporarily store a media object in a first intermediate position proximate the drive unit, and deliver and remove media objects to and from the drive unit. A second media handler is configured to deliver and remove media objects to and from the at least one storage unit in the receiving area, temporarily store a media object in a second intermediate position proximate the drive unit, and deliver and remove media objects to and from the drive unit. The media handlers are configured such that either one of the media handlers is operable to remove a first media object from the drive unit and store the first media object in a corresponding intermediate position while a second media object remains in a corresponding intermediate position in the other of the media handlers. The other of the media handlers is operable to deliver the second media object to the drive unit before the first media object is delivered to the at least one storage unit in the receiving area.

The invention also provides a media drive system operable on non-tape media objects which are capable of being stored in a tape form factor storage unit which is configured to store a plurality of the non-tape media objects. The media drive system includes a housing which defines a receiving area configured to receive a plurality of the storage units. The receiving area is accessible from outside the housing to facilitate insertion and removal of the storage units into and out of the receiving area. At least one of the storage units in the receiving area defines a queuing position. A drive unit is at least partially disposed within the housing, and a media handler arrangement is configured to transfer media objects between the storage units in the receiving area and the drive unit. The media handler arrangement includes a first media handler disposed within the housing and operable to transport a media object from one of the storage units to a first queuing position proximate the drive unit. The first media handler is further operable to cooperate with the drive unit to transfer a media object between the first queuing position and the drive unit. The media handler arrangement also includes a second media handler disposed within the housing and operable to transport a media object from one of the storage units to a second queuing position proximate the drive unit. The second media handler is further operable to cooperate with the drive unit to transfer a media object between the second queuing position and the drive unit.

DETAILED DESCRIPTION OF THE PREFERRED EMBODIMENT(S)

Figure 1:
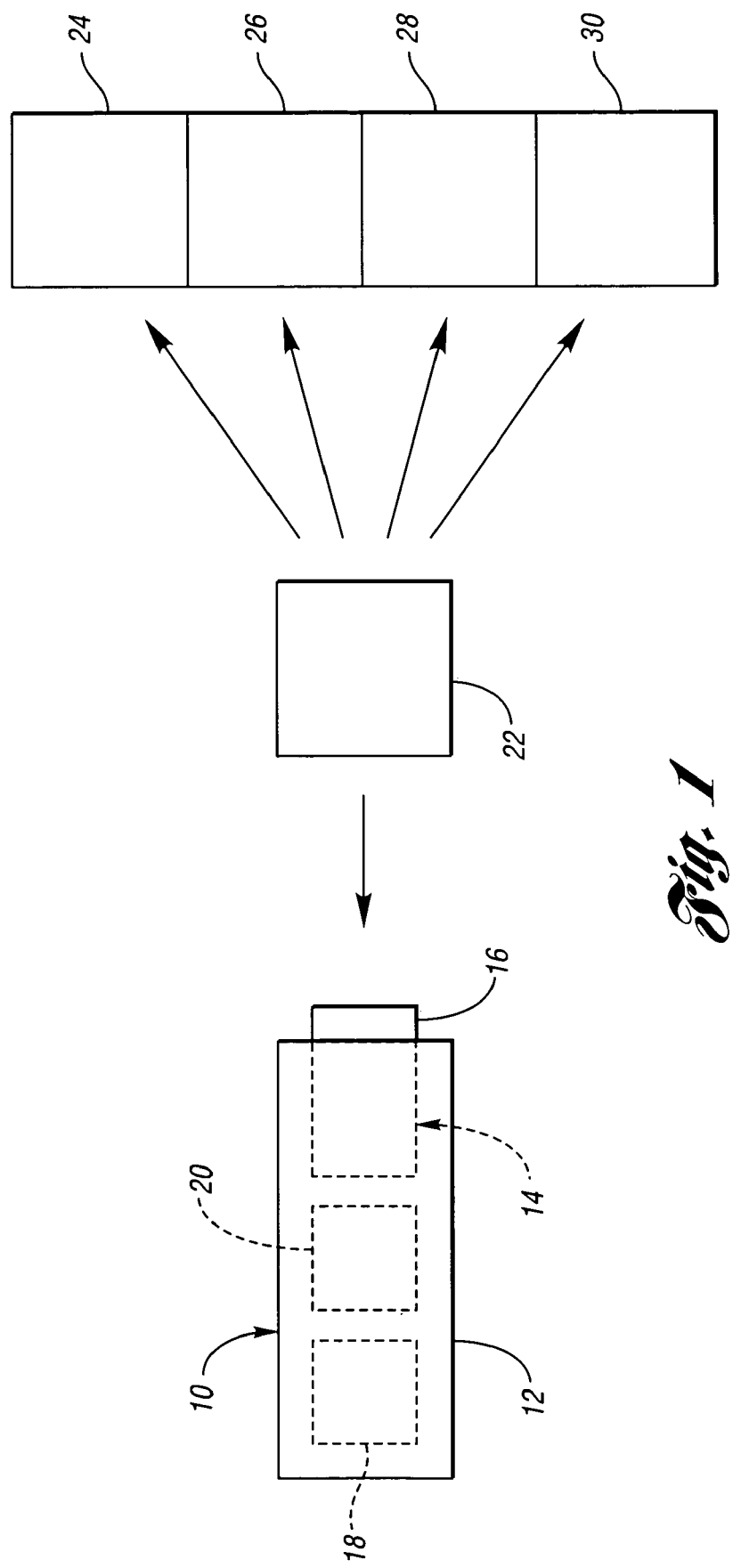
FIG. 1 is a schematic representation of a media library and a media drive system in accordance with an embodiment of the present invention.

FIG. 1 shows a media drive system 10 in accordance with an embodiment of the present invention. The media drive system 10 includes a housing 12 which defines a receiving area 14 configured to receive a plurality of storage units, such as a cartridge 16. As explained more fully below, the cartridge 16 is configured with a tape form factor, but is designed to store a plurality of non-tape media objects. The media drive system 10 also includes a drive unit 18 and a media handler arrangement 20, each of which is disposed within the housing 12.

Also shown in FIG. 1 is the media drive system 10 in relation to an automated robotic device, or picker 22, and a plurality of storage magazines 24, 26, 28, 30. The picker 22 and storage magazines 24-30 may be part of a media storage library system which is programmed to automatically perform tasks such as transferring media cartridges between the storage magazines 24-30 and the receiving area 14 of the drive system 10. As shown in FIG. 1, the receiving area 14 is accessible from outside the housing 12. It is worth noting that although it may be convenient to use the media drive system 10 in conjunction with an automated media library, such as shown in FIG. 1, it is not required. Rather, as explained in detail in conjunction with FIG. 2, the media drive system 10 provides a plurality of queuing positions for media objects to reduce latency and speed loading and access functions.

Figure 2:
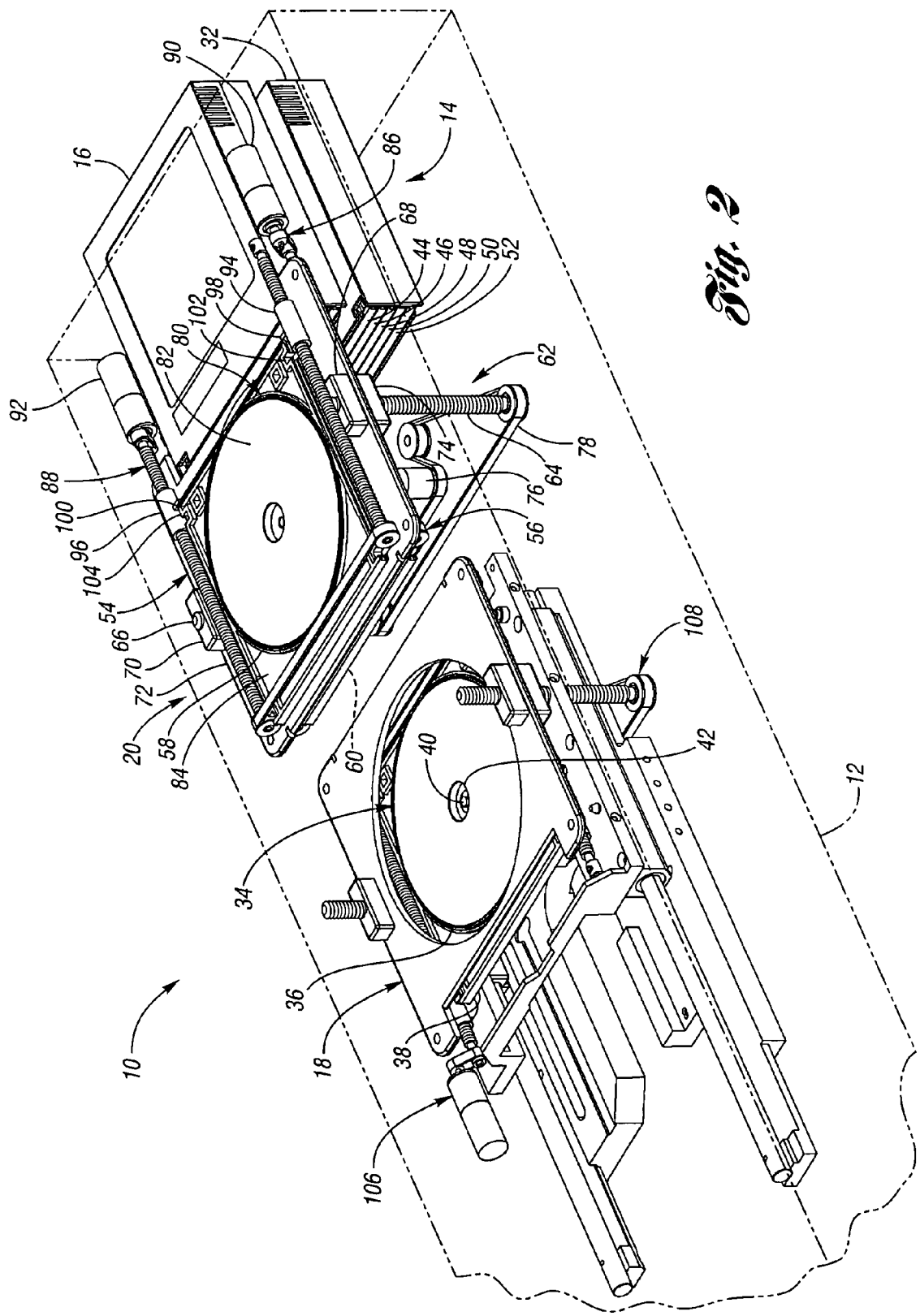
FIG. 2 is a partially fragmentary perspective view of the media drive system shown in FIG. 1.

FIG. 2 shows the media drive system 10, with the housing 12 shown in phantom so the details of the inner workings can be readily seen. In addition to the elements shown in FIG. 1, a second storage unit, or cartridge 32, is shown in the receiving area 14. Although the receiving area 14 is shown in FIG. 2 as holding a pair of cartridges 16, 32 vertically oriented to each other, it is understood that other embodiments of the present invention may be configured to receive more or less than two cartridges, and that such cartridges may be horizontally disposed in relation to each other, vertically disposed in relation to each other, or some combination thereof.

As shown in FIG. 2, a non-tape media object 34 is located in the drive unit 18. The media object 34 includes a medium, which in the embodiment shown in FIG. 2, is an optical disk, and a tray 38, which is configured to carry the disk 36. The drive unit 18 includes a driving feature, or spindle 40. The spindle 40 is configured to cooperate with a driven feature, which in the embodiment shown in FIG. 2, is an aperture 42 in the disk 36. Although FIG. 2 illustrates a common medium—i.e., the disk 36—having an aperture 42 which is driven by a spindle 40 in the drive unit 18, it is understood that the present invention contemplates different types of media. For example, a rectangular medium could be used in conjunction with a drive unit in another embodiment of the present invention. In such a case, for example, the rectangular medium may have a driven feature, such as a hub, which cooperates with a driving feature in the drive unit. With media of this type, such a drive unit may be configured to move the rectangular medium linearly in one direction, while a read/write head moves across the medium in a direction normal to the movement of the medium. Thus, the rotating disk drive arrangement illustrated in FIG. 2 is shown for exemplary purposes only.

The cartridge 32 in the receiving area 14 stores a plurality of media objects 44, 46, 48, 50, 52. Each of the media objects 44-52 includes an optical disk and tray combination, such as the disk 36 and the tray 38. Likewise, the cartridge 16 also holds a plurality of the disk and tray combinations which are accessible by the media handler arrangement 20. The media handler arrangement 20 includes a first media handler 54, and disposed directly below it, a second media handler 56. The first media handler 54 is operable to facilitate transfer of a media object between the drive unit 18 and the cartridges 16, 32 in the receiving area 14. More particularly, the first media handler 54 defines a first intermediate position, or first queuing position 58, proximate the drive unit 18. Similarly, the second media handler 56 defines a second intermediate position, or second queuing position 60, which is also proximate the drive unit 18. The second media handler 56, like the first media handler 54, is configured to facilitate transfer of media objects between the drive unit 18, and the cartridges 16, 32.

In addition to the two queuing positions defined by the media handlers 54, 56, the media drive system 10 also includes a third queuing position, defined by either one of the cartridges 16, 32. By having more than one cartridge in the receiving area 14, the media handlers 54, 56 can transfer media objects between one of the cartridges, for example the cartridge 16, and the drive system 18, while the other cartridge 32 is removed from the receiving area 14 by the picker 22 and replaced with another cartridge from one of the storage magazines 24-30 (see FIG. 1). As noted above, the receiving area 14 can be configured to hold more than two cartridges, thereby providing additional queuing positions for media objects.

As shown in FIG. 2, the media handler arrangement 20 is disposed between the drive unit 18 and the receiving area 14, which facilitates efficient transfer of media objects between the cartridges 16, 32 and the drive unit 18. The first and second media handlers 54, 56 are disposed in an over-under relationship with each other, and are movable vertically together, which ensures that they will not interfere with each other as they are moving vertically to access different media objects within the cartridges 16, 32, or when accessing the drive unit 18. Other arrangements of media handlers within a media drive system are contemplated by the present invention. For example, two media handlers, even when disposed in an over-under relationship with each other, could be independently movable in a vertical direction, although each of the media handlers may present a limit on the vertical movement of the other. To effect vertical movement of the first and second media handlers 54, 56, the media handler arrangement 20 includes a vertical actuator arrangement 62.

In the embodiment shown in FIG. 2, the vertical actuator arrangement 62 includes first and second lead screws 64, 66. The lead screws 64, 66 are respectively disposed through first and second vertical lead screw followers 68, 70, each of which is attached to a carrier 72. Disposed on an opposite side of the carrier 72 from the first lead screw follower 68, is a third vertical lead screw follower 74. It is understood that a similar lead screw follower is disposed opposite the second lead screw follower 66, but is not visible in the view shown in FIG. 2. To actuate vertical movement of the first and second media handlers 54, 56, a torque producing apparatus, such as a small electric motor 76, is used to rotate a belt 78 which simultaneously rotates the lead screws 64, 66. This moves the first and second media handlers 54, 56 vertically so that they can be properly aligned with one of the cartridges 16, 32, or the drive unit 18, to effect transfer of a media object.

As shown in FIG. 2, the drive unit 18 is loaded with a disk 36 and tray 38. Similarly, the first media handler is shown holding another media object 80, which also includes a disk 82 and a tray 84. Thus, in the embodiment shown in FIG. 2, the drive unit 18 is loaded with a media object 34, and the first queuing position 58 holds a second media object 80. This leaves the second queuing position 60 empty, and ready to receive another media object. When the media drive system 10 is in operation, the drive unit 18 will finish with the media object 34, and will transfer it to the empty, second queuing position 60 in the second media handler 56. The first media handler 54 will then deliver the second media object 80 from the first queuing position 58 to the drive unit 18, thereby significantly reducing the amount of time during which the drive unit 18 is empty.

After the second media object 80 has been successfully delivered to the drive unit 18, the first media object 34 will be returned to its position in the cartridge 16, and another of the media objects from either the cartridge 16 or the cartridge 32 will be retrieved by either the first or second media handler 54, 56. The media handler arrangement 20 will then have one of its media handlers 54, 56 empty, and ready to receive the second media object 80 from the drive unit 18. The other of the media handlers 54, 56 will contain a queued media object, ready to feed the drive unit 18 as soon as the second media object 80 is removed.

In order to effect transfer of media objects to and from the media handlers 54, 56, each of them includes a respective horizontal actuator arrangement, which in the embodiment shown in FIG. 2, are horizontal lead screw arrangements 86, 88. It is worth noting that although the vertical actuator arrangement 62 and the horizontal actuator arrangements 86, 88 are shown employing the use of lead screws and lead screw followers, other actuator arrangements are contemplated by the present invention. For example, belts, gears, and/or some combination thereof, may be used to effect the transfer of media objects from cartridges in the receiving area 14 to the first and second media handlers 54, 56, and to and from the drive unit 18. The first horizontal lead screw arrangement 86 includes a torque producing device, which, in the embodiment shown in FIG. 2, is a small electric motor 90. Similarly, the second horizontal lead screw arrangement 88 includes a second motor 92.

It is worth noting that in FIG. 2, certain common elements have been omitted for clarity. For example, attachment structures for the motors 90, 92, as well as attachment structures for the vertical actuator arrangement 62, and the cartridges 16, 32, have been omitted. It is understood that any effective means may be used to secure these elements so that they perform their intended functions. For example, some or all of these elements of the actuator arrangements 62, 86, 88 could be attached to the housing 12 via fasteners. Similarly, slots could be formed within the housing 12 to hold the cartridges 16, 32, and likewise, a structure or structures may surround at least a portion of the media handlers 54, 56 to provide grooves or slots to support the media objects.

Returning to the horizontal lead screw arrangements 86, 88, it is seen that each of them includes a respective horizontal lead screw follower 94, 96. Each of the lead screw followers 94, 96, includes an attachment structure, which, in the embodiment shown in FIG. 2, are respective projections 98, 100. The projections 98, 100 cooperate with the tray 84 to effect horizontal movement of the tray 84 to and from the first media handler 54. In the current position shown in FIG. 2, the projections 98, 100 can push the tray 84 toward the drive unit 18. If it is desired to push the tray 84 to a storage location within one of the cartridges, for example the cartridge 16, the first horizontal lead screw arrangement 86 can be actuated such that the lead screw followers 94, 96 rotate at least a partial turn, such that the projections 98, 100 are oriented away from the tray 84. Further actuation of the first horizontal lead screw arrangement 86 would cause the lead screw followers 94, 96 to move to the end of the tray 84 closest to the drive unit 18. The lead screw arrangement 86 could be momentarily reversed, such that the projections 98, 100 were then in contact with the tray 84, ready to push it towards its storage location in the cartridge 16.

The horizontal lead screw arrangements 86, 88, also contemplate pulling a tray, such as the tray 84. For example, the tray 84 includes receiving portions, which, in the embodiment shown in FIG. 2, are notches 102, 104. Just as the lead screw followers 94, 96 were moved from one end of the tray 84 to the other, they could be moved adjacent the notches 102, 104, so that reverse actuation of the lead screw arrangement 86 causes the projections 98, 100 to be disposed within the notches 102, 104. In this way, actuation of the horizontal lead screw arrangement 86 could push or pull the tray 84, as desired. In order to move a media object, such as the media object 80, from one of the media handlers 54, 56, the drive unit 18 also includes a horizontal actuator, which, in the embodiment shown in FIG. 2, is also a horizontal lead screw arrangement 106, configured similarly to the lead screw arrangements 86, 88 on the media handlers 54, 56. The lead screw arrangement 106 helps to ensure that the media object is properly aligned in the drive unit 18, for example, to ensure that the aperture 42 in the disk 36 is properly aligned with the spindle 40. The drive unit 18 also includes a vertical actuator, in the form of a vertical lead screw arrangement 108, similarly configured to the lead screw arrangement 62 used by the media handlers 54, 56.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A media drive system operable on media objects capable of being stored in a storage unit, the media drive system comprising:

a housing defining a receiving area configured to receive a plurality of storage units, at least one of the storage units in the receiving area defining a queuing position;

a drive unit at least partially disposed within the housing; and a media handler arrangement configured to transfer media objects between the storage units in the receiving area and the drive unit, the media handler arrangement including a first media handler defining a first queuing position for a media object proximate the drive unit, and a second media handler defining a second queuing position for a media object proximate the drive unit, and wherein the first media handler is operable to facilitate transfer of a media object between the drive unit and the first queuing position, and between the first queuing position and the storage units in the receiving area, and the second media handler is operable to facilitate transfer of a media object between the drive unit and the second queuing position, and between the second queuing position and the storage units in the receiving area, the first media handler including a first horizontal lead screw arrangement configured to effect horizontal movement of a media object into and out of the first queuing position, the second media handler including a second horizontal lead screw arrangement configured to effect horizontal movement of a media object into and out of the second queuing position, and the drive unit including a horizontal lead screw arrangement configured to cooperate with the first and second horizontal lead screw arrangements to effect a transfer of a media object between the drive unit and the first and second queuing positions, respectively.

2. The media drive system of claim 1, wherein the receiving area is configured to receive the storage units in a substantially vertical stack, and the first and second media handlers are disposed in an over-under relationship with each other, and are movable vertically together, thereby avoiding interference between the first and second media handlers as they move vertically to access different media objects within the storage units in the stack.

3. The media drive system of claim 1, wherein each of the horizontal lead screw arrangements includes at least one horizontal lead screw follower having a projection disposed thereon, and wherein the media objects stored in the storage units include a media object having a disk and a tray configured to carry the disk, the tray including a receiving portion configured to cooperate with the projections on the horizontal lead screw followers to facilitate horizontal movement of the tray when a respective horizontal lead screw follower is actuated.

4. The media drive system of claim 3, wherein the media handler arrangement further includes:

a carrier having the first and second media handlers attached thereto, first and second vertical lead screw followers attached to the carrier, first and second vertical lead screws respectively disposed through the first and second vertical lead screw followers, and a torque producing apparatus for rotating the lead screws to effect vertical movement of the carrier, thereby vertically moving the first and second media handlers.

5. A media drive system operable on media objects capable of being stored in a storage unit, the media drive system comprising:

a housing defining a receiving area configured to receive at least one storage unit;

a drive unit at least partially disposed within the housing; and a media handler arrangement configured to transfer media objects between the at least one storage unit in the receiving area and the drive unit, the media handler arrangement including:

a first media handler configured to deliver and remove media objects to and from the at least one storage unit in the receiving area, temporarily store a media object in a first intermediate position proximate the drive unit, and deliver and remove media objects to and from the drive unit, and a second media handler configured to deliver and remove media objects to and from the at least one storage unit in the receiving area, temporarily store a media object in a second intermediate position proximate the drive unit, and deliver and remove media objects to and from the drive unit, the media handlers being further configured such that either one of the media handlers is operable to remove a first media object from the drive unit and store the first media object in a corresponding intermediate position while a second media object remains in a corresponding intermediate position in the other of the media handlers, the other of the media handlers being operable to deliver the second media object to the drive unit before the first media object is delivered to the at least one storage unit in the receiving area, the receiving area being configured to receive the at least one storage unit, thereby allowing a first storage unit of the at least one storage unit in the receiving area to be removed and replaced with another storage unit from outside the receiving area while the media handlers transfer media objects between a second storage unit of the at least one storage unit in the receiving area and the drive unit, and wherein the media objects stored in the storage units include a media object having a medium and a tray configured to carry the medium, each of the media handlers being configured with an attachment structure configured to cooperate with the tray for facilitating movement of the tray and medium from its storage unit to a respective intermediate position, the drive unit including a driving feature configured to cooperate with a driven feature in the medium for effecting movement of the medium, the drive unit further including an attachment structure configured to cooperate with the tray for facilitating movement of the tray and medium from one of the intermediate positions to the drive unit, such that the driven feature in the medium is substantially aligned with the driving feature.

6. The media drive system of claim 5, wherein the at least one storage unit in the receiving area is configured to store a plurality of the media objects in a substantially vertical arrangement, and each of the media handlers is vertically movable to facilitate access by each of the media handlers to more than one of the media objects.

7. The media drive system of claim 6, wherein the first and second media handlers are disposed in an over-under relationship with each other, and are movable vertically together, thereby avoiding interference between the first and second media handlers as they move vertically to access different media objects within the at least one storage unit.

8. A media drive system operable on non-tape media objects capable of being stored in a tape form factor storage unit configured to store a plurality of the non-tape media objects, the media drive system comprising:

a housing defining a receiving area configured to receive a plurality of storage units, the receiving area being accessible from outside the housing to facilitate insertion and removal of the storage units into and out of the receiving area, at least one of the storage units in the receiving area defining a queuing position:

a drive unit at least partially disposed within the housing; and a media handler arrangement configured to transfer media objects between the storage units in the receiving area and the drive unit, the media handler arrangement including:

a first media handler disposed within the housing and operable to transport a media object from one of the storage units to a first queuing position proximate the drive unit, and further operable to cooperate with the drive unit to transfer a media object between the first queuing position and the drive unit, and a second media handler disposed within the housing and operable to transport a media object from one of the storage units to a second queuing position proximate the drive unit, and further operable to cooperate with the drive unit to transfer a media object between the second queuing position and the drive unit, each of the media handlers including a respective horizontal actuator arrangement for effecting horizontal movement of medium and tray combinations to and from the media handler, and the drive unit further including a horizontal actuator arrangement configured to cooperate with the horizontal actuator arrangements of the media handlers to effect transfer of medium and tray combinations between the drive unit and a respective media handler.

9. The media drive system of claim 8, wherein each of the non-tape media objects includes a respective medium and tray combination, each of the trays being configured to carry a respective medium, and wherein each of the storage units includes a cartridge having a tape form factor, and the drive unit includes a driving feature for effecting movement of the medium.

10. The media drive system of claim 9, wherein a first of the cartridges in the receiving area stores medium and tray combinations to be selectively moved to and from the drive unit, and wherein a second of the cartridges defines a third queuing position such that medium and tray combinations in the second cartridge can be selectively moved to and from the drive unit while the first cartridge is removed from the receiving area and replaced with another cartridge from outside the receiving area.

11. The media drive system of claim 10, wherein the media handlers are further configured such that either one of the media handlers is operable to remove a first medium and tray combination from the drive unit and store it in a corresponding queuing position while a second medium and tray combination remains in a corresponding queuing position in the other of the media handlers, the other of the media handlers being operable to deliver the second medium and tray combination to the drive unit before the first medium and tray combination is delivered to its cartridge in the receiving area.

12. The media drive system of claim 11, wherein the media handler arrangement is disposed between the drive unit and the receiving area, thereby facilitating efficient transfer of medium and tray combinations between the drive unit and the cartridges.

13. The media drive system of claim 12, wherein the media handler arrangement further includes a vertical actuator arrangement for effecting vertical movement of the media handlers.

* * * * *